US010157202B2

(12) United States Patent
Dickie

(10) Patent No.: US 10,157,202 B2
(45) Date of Patent: *Dec. 18, 2018

(54) MULTI STAGE AGGREGATION USING DIGEST ORDER AFTER A FIRST STAGE OF AGGREGATION

(71) Applicant: International Business Machines Corporation, Armonk, NY (US)

(72) Inventor: Garth A. Dickie, Framingham, MA (US)

(73) Assignee: International Business Machines Corporation, Armonk, NY (US)

( * ) Notice: Subject to any disclaimer, the term of this patent is extended or adjusted under 35 U.S.C. 154(b) by 533 days.

This patent is subject to a terminal disclaimer.

(21) Appl. No.: 14/246,690

(22) Filed: Apr. 7, 2014

(65) Prior Publication Data

US 2015/0286676 A1 Oct. 8, 2015

(51) Int. Cl.
*G06F 17/30* (2006.01)
*G06F 7/36* (2006.01)

(52) U.S. Cl.
CPC .......... *G06F 17/30412* (2013.01); *G06F 7/36* (2013.01)

(58) Field of Classification Search
CPC . G06F 17/30864; G06F 17/30598; G06F 7/36
See application file for complete search history.

(56) References Cited

U.S. PATENT DOCUMENTS

| 5,511,190 | A * | 4/1996 | Sharma ............. G06F 17/30489 |
| 6,256,621 | B1 * | 7/2001 | Tsuchida ........... G06F 17/30445 |
| 6,381,601 | B1 * | 4/2002 | Fujiwara ........... G06F 17/30489 707/692 |
| 7,035,843 | B1 | 4/2006 | Bellamkonda et al. |
| 2002/0029214 | A1 * | 3/2002 | Yianilos ............ G06F 17/30327 |
| 2002/0129032 | A1 | 9/2002 | Bakalash et al. |
| 2009/0249023 | A1 * | 10/2009 | Qiao ................. G06F 17/30489 711/216 |
| 2012/0323970 | A1 * | 12/2012 | Larson ............. G06F 17/30949 707/800 |
| 2014/0337375 | A1 * | 11/2014 | Yue ................... G06F 17/30424 707/769 |
| 2015/0288691 | A1 | 3/2015 | Dickie |
| 2015/0286676 | A1 | 10/2015 | Dickie |

OTHER PUBLICATIONS

List of IBM Patents or Patent Applications Treated as Related, Mar. 4, 2015.

(Continued)

*Primary Examiner* — Loc Tran

(74) *Attorney, Agent, or Firm* — Robert Bunker; Edell, Shapiro & Finnan, LLC

(57) ABSTRACT

According to embodiments of the present invention, methods, systems and computer readable media are presented for processing a database query. The query may specify an arrangement for resulting data. A digest is generated for each of a plurality of database object elements. The plurality of database object elements are grouped or mapped into one or more groups based on the digest to arrange the database object elements in digest order. The database object elements from the one or more groups are extracted and/or processed in order of the digest, in accordance with the specified arrangement.

12 Claims, 6 Drawing Sheets

(56) References Cited

OTHER PUBLICATIONS

Internet Society et al.; "The Managed Object Aggregation MIB" (RFC4498); http://ip.com/IPCOM/000136626D; May 25, 2006.
Multicore Algorithmics, "Hopscotch Hashing", Multicore TAU Group, http://mcg.cs.tau.ac.il/projects/hopscotch-hashing-1, accessed Feb. 2014, 2 pages.
Herlihy et al., "Hopscotch Hashing", http://mcg.cs.tau.ac.il/papers/disc2008-hopscotch.pdf, accessed Feb. 2014, 16 pages.
"Hopscotch Hashing", Wikipedia, http://en.wikipedia.org/wiki/Hopscotch_hashing, accessed Feb. 2014, 2 pages.
List of IBM Patents or Patent Applications Treated as Related, Nov. 18, 2016.

* cited by examiner

MULTI STAGE AGGREGATION USING DIGEST ORDER AFTER A FIRST STAGE OF AGGREGATION

BACKGROUND

Present invention embodiments relate to multistage aggregation, and more specifically, to using digest order to reduce downstream computations after a first stage of aggregation.

The largest consumers of a central processing unit (CPU) in a data warehouse are aggregation operations such as "GROUP BY" and "JOIN" operations. In massively parallel processing systems, GROUP BY operations are often performed in two phases: a first phase involving local aggregation of data, e.g., data located on a single node, followed by a repartitioning of the data, and a second phase involving global aggregation of data, e.g., combining first phase data from a plurality of nodes. If there are a large number of distinct aggregation groups, the second phase can do almost as much computational work as the first phase and a significant performance cost is incurred.

SUMMARY

According to one embodiment of the present invention, methods, systems and computer-readable media are presented for processing a database query. The query may specify an arrangement for resulting data. A digest is generated for each of a plurality of database object elements. The plurality of database object elements are grouped or mapped into one or more groups based on the digest to arrange the database object elements in digest order. The database object elements from the one or more groups are extracted and/or processed in order of the digest, in accordance with the specified arrangement.

BRIEF DESCRIPTION OF THE SEVERAL VIEWS OF THE DRAWINGS

Generally, like reference numerals in the various figures are utilized to designate like components.

DETAILED DESCRIPTION

Figure 1:
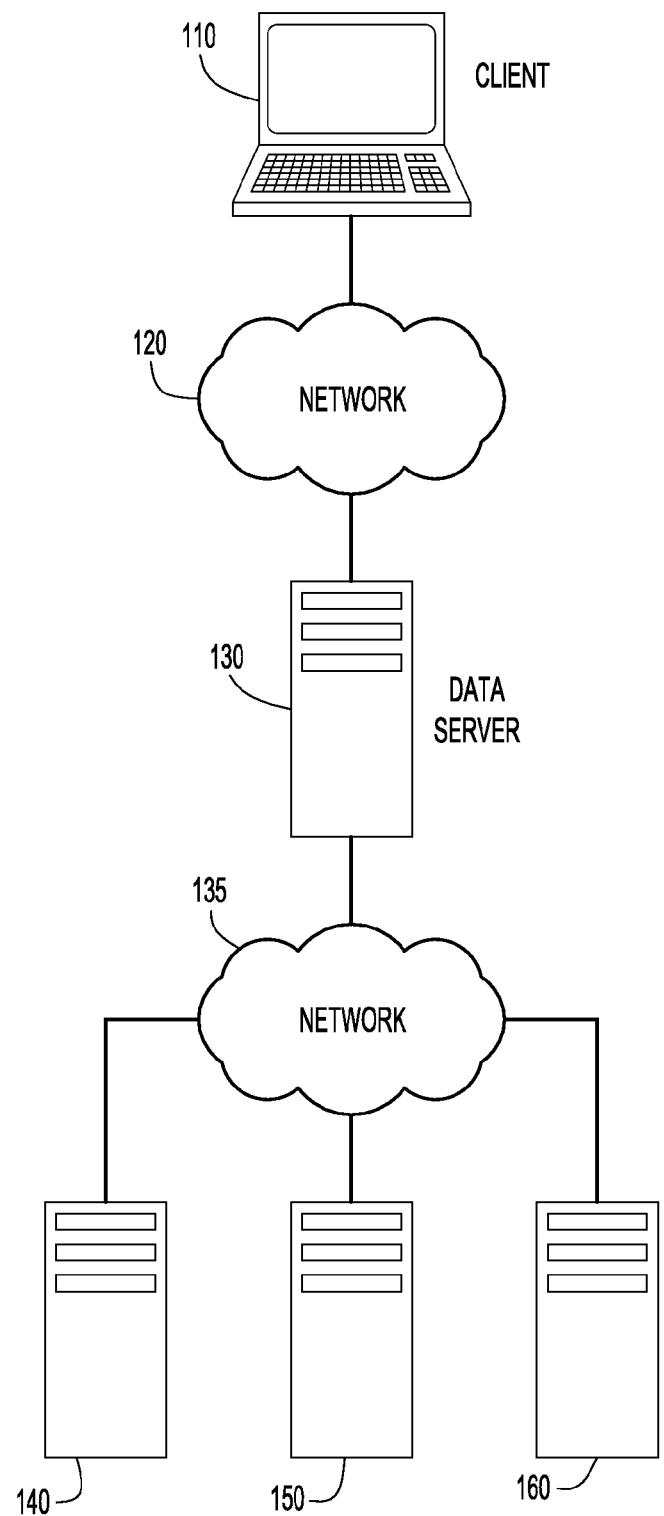
FIG. 1 is an illustration of an example computing environment for use with an embodiment of the present invention.

With reference now to FIG. 1, an example environment for use with present invention embodiments is illustrated. Specifically, the environment includes a client system 110, a data server 130, and a plurality of nodes (or servers) 140-160. Client system 110 and data server 130 may be remote from each other and communicate over a network 120. Data server 130 and nodes 140-160 may be remote from each other and communicate over another network 135. Query requests, originating from client system 110 may be transmitted to data server 130 to locate and retrieve data stored on any of nodes 140-160, e.g., based upon an aggregation operation. Networks 120 and 135 may be implemented by any number of any suitable communications media (e.g., wide area network (WAN), local area network (LAN), Internet, Intranet, etc.). Alternatively, client system 110 and data server 130 may be local to each other, and communicate via any appropriate local communication medium (e.g., local area network (LAN), hardwire, wireless link, Intranet, etc.).

Client system 110 enables users to submit queries (e.g., GROUP BY clauses, JOIN clauses, other aggregation-based operations, etc.) to data server 130 to retrieve data in one or more nodes 140-160. Client system 110 may present a graphical user (e.g., GUI, etc.) or other interface (e.g., command line prompts, menu screens, etc.) in order to receive query information (e.g., parameters, clauses, etc.) from an end user and provide resultant data.

Data server 130 may be implemented by any conventional or other database or storage unit, may be local to or remote from client system 110, as well as local to or remote from nodes 140-160, and may communicate via any appropriate communication medium (e.g., local area network (LAN), wide area network (WAN), Internet, hardwire, wireless link, Intranet, etc.). Data server 130 may store and retrieve information from nodes 140-160, at the direction of client 110, and may receive requests from and send replies to client system 110.

A plurality of nodes, or database storage units, 140-160 may be present in a data warehouse. Nodes 140-160 may store information for analysis (e.g., data, aggregate data in response to queries, etc.). Additionally, each node may contain, in addition to memory, a processor for performing aggregation operations as disclosed herein. In other embodiments, aggregation operations may be performed at another device (not at the node). Network 135 provides communication between each node and data server 130, as well as between each of the nodes.

Figure 2A:
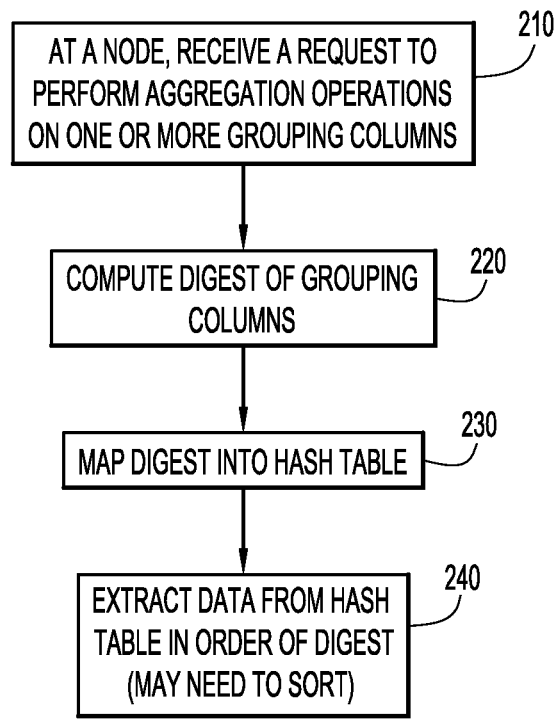
FIGS. 2A-2B are procedural flow charts according to embodiments of the present invention.
Figure 2B:
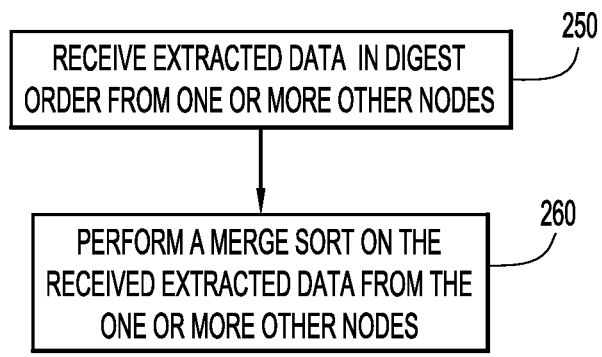

Referring to FIGS. 2A-B, an example flowchart is provided according to present invention embodiments. FIG. 2A encompasses computations during a first phase of aggregation, at a node. At operation 210, a request to perform aggregation operations on one or more grouping columns is received. At operation 220, a digest of one or more grouping columns is computed. At operation 230, the digest is mapped into a hash table. At operation 240, data is extracted from the hash table in order of digest (or near order of digest).

FIG. 2B encompasses computations during a second phase of aggregation. At operation 250, extracted data is received in digest order from one or more other nodes. At operation 260, a merge sort is performed on the received extracted data from the one or more other nodes, to produce a consolidated set of results. Thus, a merge sort operation is used to merge multiple streams of data, each stream sorted in the same way. Aggregation operations are performed to combine entries from different streams which have the same sort keys.

Figure 3:
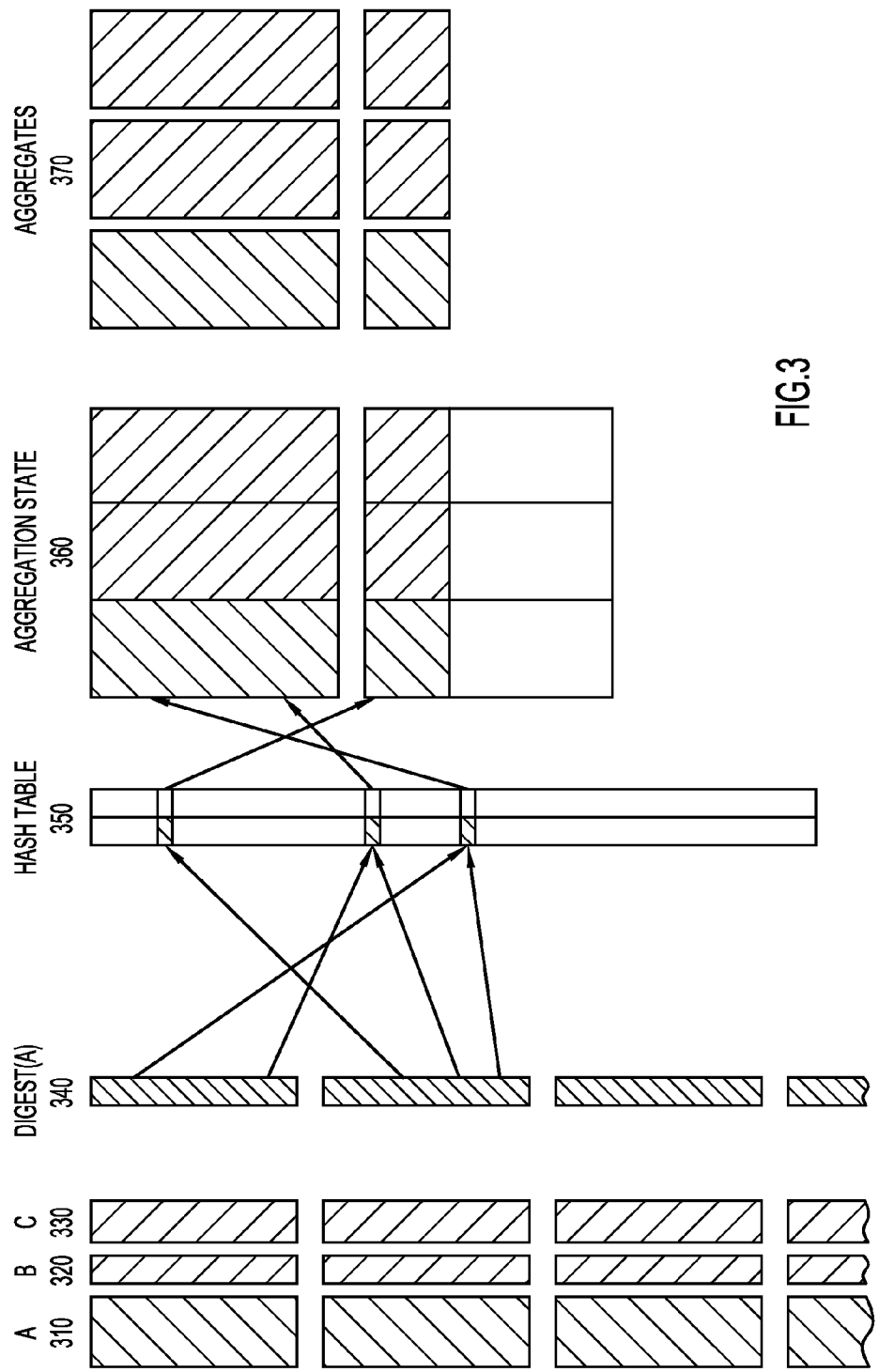
FIG. 3 is an example illustration showing an aggregation operation at a single node according to an embodiment of the present invention.

Referring to FIG. 3, a graphical illustration of the first phase of aggregation is shown. Grouping column A 310 represents selected column data; rows which have equivalent values in column A are placed into the same aggregation group. Data from column B 320 and column C 330 is used to compute aggregation values for each group. Various operations may be performed on the data of columns B and C, such as a summation (sum(C)) or a minimization (min (B)) to determine the output values for each group. Additionally, data in grouping column A is typically not sorted beforehand.

A digest of grouping column A 310 is shown at digest 340. A digest is computed by a hash function, which takes as input, a fixed or variable length input, and converts it to a fixed length output (called a digest or hash value), which is usually smaller than the input. In some embodiments, outputs may be fixed-size bitstrings of e.g., 32 bits or 64 bits. For example, cryptographic hash functions SHA-1, MD5, etc. or a CRC based function, may all be used as hash functions. Present invention embodiments are independent of a particular choice of hash function. Additionally, in some embodiments, preprocessing may be needed, as described herein, in order to normalize input values to hash functions.

In some embodiments, a digest may be formed from a combination of grouping columns, e.g., cases in which multiple columns are used as grouping columns. For example, a digest may be computed by first normalizing the values from each column, then placing the normalized values adjacent to each other in memory, and computing a digest of the contiguous memory region. Alternatively, a digest may be formed by computing a digest of a first column, and using that digest as a "seed" for a hash function on the second column, and proceeding in this fashion for each of the multiple columns. In still further embodiments, a digest may be computed independently for each column, and the digests combined afterwards, e.g., by an XOR function, a summation function, by application of another hash function to the corresponding concatenated column digests, etc. Generally, hash functions should also have good entropy, to allow mapping input values onto digest values in a semi-random way.

Due to complexities in data representation, e.g., fixed and variable length character strings, integers of different sizes and different representations, complexities in dealing with floating point data (e.g., a floating point format having a different binary representation for positive zero and negative zero), the hash function usually includes a normalization step, or is designed to produce the same digest value for equivalent input values. For example, integers may be sign extended to a common size before digesting, or may each be reduced to a minimum number of bytes to represent the value of the integer before digesting. Floating point values may have negative zero replaced by positive zero before computing a digest. String values may be trimmed of trailing spaces, or have all space characters elided entirely. Data which is equal or belongs in the same group should have the same digest, and data with small differences in input, e.g., "group of data" and "groups of data", should produce different digests.

Once digests have been computed, a mapping operation is performed to map digest values 340 into hash table 350, such that a range of digests are mapped onto a range of buckets of the hash table. Mapping a digest into a hash bucket should utilize, e.g., a linear transform, to ensure that hash bucket order corresponds to digest order.

During this operation, a digest is assigned to a particular location (e.g., a hash table bucket of hash table 350), with the assignment based upon the value of the digest itself. (This may involve multiplying the digest by the size of the hash table and taking the overflow word of the result as the bucket number.) Referring to FIG. 3, it is noted that column A is generally not ordered, and the digest of column A is also not usually ordered. Ordering occurs by mapping/assigning values of the digest into buckets of the hash table.

Present invention embodiments are not limited to a particular type of mapping function, and may encompass any function, e.g., a hash function, which maps a digest value to a hash bucket and is significantly order-preserving. Thus, a digest value of "0" should map to a hash bucket near the start/top of the hash table, and a maximum digest value should map to a hash bucket near the end/bottom of the hash table. This mapping ensures that entries read out of the hash table (in hash table bucket order) are read out in approximately digest order. Additionally, mapping functions should generally distribute digests throughout the hash table to achieve a reasonable distribution of entries, and avoid a large number of entries in any local region for bucket) of the hash table.

In contrast, a mapping function which is not order preserving will not have the property of ordering entries in a hash table according to digest (or near digest) order. For example, some functions, such as the modulus function, which are commonly used for mapping entries to particular buckets of a hash table, would not have the property of ordering entries according to digest order. While modulus functions may be used to compensate for a non-entropic hash function (e.g., an identity hash function applied to integer values), resulting in a more even distribution of values throughout the hash table, such functions would generally not be suitable for the techniques disclosed herein. Modulus functions generally result in unrelated digest values ending up near each other in the hash table, and therefore, do not correspond with digest order.

Preferably, present invention embodiments also encompass methods and techniques for resolving hash bucket collisions, such that upon the occurrence of a hash bucket collision, values are stored nearby in the hash bucket table, and not at a random location (as in traditional open hashing). Collisions occur when two different input values in column A produce the same digest. Collisions also occur when two different digests map onto the same hash bucket according to the mapping function. For example, a hashing algorithm which allows storing a linked list in a hash bucket meets the above specified criteria. The linked list may be maintained as sorted by digest, sorted by digest and grouping column value, or may be kept unsorted. Other approximations, such as haystack hashing, may work equally as well. In haystack hashing, hash table entries are all stored within the hash table, not in linked lists. Each entry is guaranteed to be stored within a fixed maximum distance of the bucket identified by the mapping from digest to hash bucket.

Thus, the techniques described herein ensure that the records stored in the hash table (e.g., in hash bucket order) are stored in the same order (or nearly the same order) as digest order. Careful choice of hash table algorithms allows processing and/or extraction of data in digest order (or near digest order) on each node at the end of the first phase of aggregation.

It is noted that digest order is not a natural order for extracting aggregation records; the most natural order is aggregation-record order, i.e. the order in which new aggregation groups are discovered. For example, an aggregation state, such as the running partial sum of column C, may be maintained within the hash table, or may be maintained in a separate data store. This separate storage is allocated as needed, with a new aggregation record allocated whenever a new grouping key is found, e.g., when a lookup is performed to find a hash table bucket for a particular digest and no collisions are found; when only collisions with different digests are found; or when only collisions which have the same digest but different grouping column values are found. (It is noted that records usually arrive in arbitrary order. The aggregation state order will generally reflect this—each time a new aggregation group is seen for the first time, a state for that group will be allocated. In contrast, digest order, which is a function of the digests of the aggregation key values, is generally unrelated to aggregation order.) Accordingly, the most natural order for extracting final aggregation values (from a combined data structure including a hash table and a corresponding aggregation grouping state) is to read the aggregation grouping state in the order in which it was allocated. The aggregation state comprises information including, e.g., the grouping column values, stored in an order to resolve collisions of digests as well as the aggregations of the additional columns. Additionally, the aggregation state generally does not have gaps to skip over, in contrast, reading data by scanning the hash table is, on its own, sub-optimal—empty hash table buckets are skipped and disordered memory accesses are performed to retrieve aggregation state records corresponding to each hash table entry.

In some embodiments, the hash table will need to be expanded, due to, e.g., too many collisions occurring. As an example, each bucket of the hash table may be split into two buckets, and the digest may be used to determine which of the buckets the data goes into. It may be convenient, in such cases, to use a hash table whose size is based upon a power of two and to choose a hash table bucket based upon high end hits of the digest.

If the hash table is resized (because, for example, the average chain length or maximum chain length is too large), then buckets may be chosen by the same algorithm with a larger hash table size. This process may be optimized by scanning hash table buckets in hash table order, and choosing buckets as above in digest order, allowing insertion into the new hash table to follow a sequential pattern through memory.

Each spot in the hash table that is occupied will point to an aggregation state 360. Aggregation operations may perform a variety of operations on grouped data to return fewer results (or even a single result) than the original set of data. In this example, the aggregation state 360 stores the values for column A as well as data based upon columns B and C. If the grouping column(s) are small and of a fixed size, and the aggregation state is also small, then alternatively, aggregation states may be stored directly in the hash table, without a separate allocation of aggregation state records.

Values from column A are stored because collisions may occur when mapping digests into hash table 350. Collisions occur when the same digests are produced from two different input values in column A. Part of the hash table lookup operation involves verifying that not only do the digests match, but also, that the corresponding values in column A match, to ensure that digests are placed in an appropriate bucket. Collisions may be handled by linear probing, haystack hashing, by storing a linked list at each hash bucket which has collisions, or any other algorithm which keeps similar digests close together.

Aggregation states include unallocated aggregation space, which may be used as new hash table entries are added, as the hash table is expanded. Once all of the input data has been processed, final aggregates are produced at 370, based upon aggregation state 360.

Figure 4:
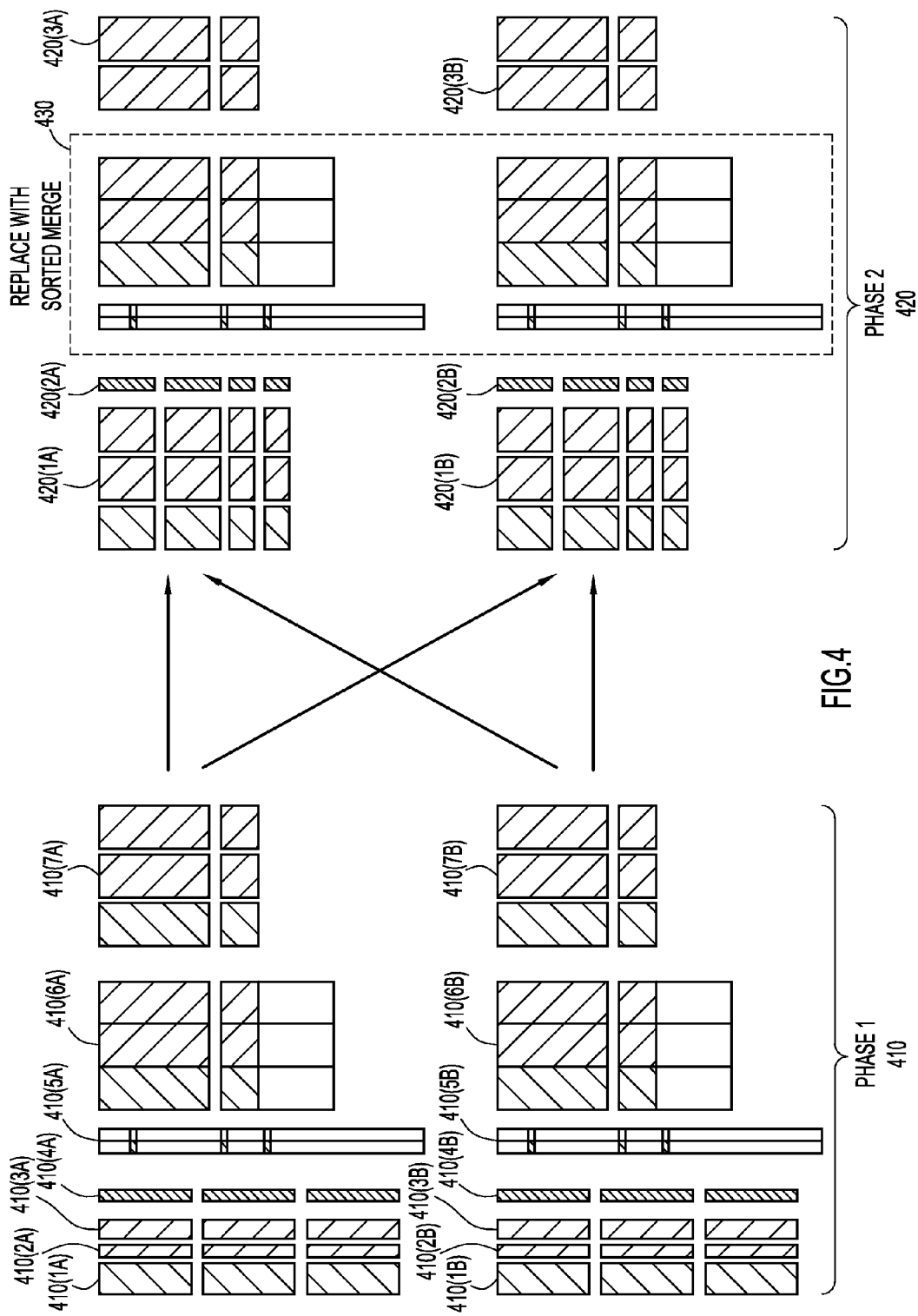
FIG. 4 is an example illustration showing aggregation of data from multiple nodes according to an embodiment of the present invention.

Referring to FIG. 4, upon exit from the first phase of aggregation 410, data is redistributed between nodes (in this example, two nodes), as represented by the cross bars. It is desirable that data, in each local group on a node, ends up globally on the same node. Thus, data is redistributed in a manner that ensures that two records that are in the same group and have the same digest will ultimately be on the same node.

It is noted that the representation of data in FIG. 4 corresponds to the example shown in FIG. 3. For instance, columns 410(1A), 410(2A) and 410(3A) as well as 410(1B), 410(2B) and 410(3B) correspond to columns A, B, and C of FIG. 3 respectfully. Digests are represented by 410(4A) and 410(4B). Hash tables are shown at 410(5A) and 410(5B). Aggregation states are represented by 410(6A) and 410(6B), and aggregates are represented by 410(7A) and 410(7B). Results of the combined first stage of aggregation (from multiple nodes) are represented by 420(1A) and 420(1B) while corresponding hash tables are represented by 420(2A) and 420(2B). Computations that may be replaced by a merge sort operation are highlighted in dashed box 430. Resultant aggregate data is represented by 420(3A) and 420(3B).

It is further noted that when reading intermediate results out of a hash table at the end of the first phase, the results, which may be close to digest order, may not be stored exactly in digest order. For example, if a linked list has been used in each hash bucket, the linked list may or may not be sorted by digest order. As another example, if haystack hashing has been used, results extracted in hash bucket order may need to be sorted by digest and key order.

When extracting records from the hash table at the end of the first phase, the aggregation records within each bucket may be sorted by their digest value, then by their grouping keys, or a 1-1 function of the grouping keys.

A streaming sort operation, such as a heap sort, may be used to sort records during extraction. In this case, the results would be fed through a heap sort with a relatively small heap. This ensures that all streams arriving at the second phase are all sorted in a common order, so that a merge sort step can be performed, e.g., using the digest followed by the grouping keys as the sort key.

As discussed herein, streams of data for the second phase may be merged downstream using a merge sort operation rather than a second round of hash table based aggregation. This has computational advantages, as neither a full sort nor a hash lookup operation needs to be performed during the second stage.

Present invention embodiments allow aspects of a second phase of aggregation 420 to be replaced with a merge sort aggregation, as shown in block 430, without utilizing computationally intensive hash table lookup based operations. In particular, block 430 shows specific operations that may be replaced by merge sort operations. Thus, while the first phase may still incur a heavy computational load, the second phase becomes a computationally less intense merge sort operation. It is also noted that although FIG. 4 shows processing associated with two nodes, the techniques presented herein apply to virtually an unlimited number of nodes, e.g., a hundred nodes, several hundred nodes, or more.

Merging multiple streams of data, in which each stream is sorted by digest order, does not incur as heavy a computational toll from associated random memory access patterns as does hash table lookup based aggregation. With regard to hash table lookup based aggregation, the vast majority of CPU time is spent looking at hash buckets, as the access pattern for the hash table is essentially random, and the hash table is likely to be larger than the cache in the CPU system. (System memory is slow (40 ns to access data from system memory) as compared to CPU (capable of executing instructions in a less than 1 ns), and thus, heavy access of random memory incurs an associated cost). On certain workloads, hash table lookup for aggregation can constitute up to 50% of the total compute work (CPU time) performed in the system.

Figure 5:
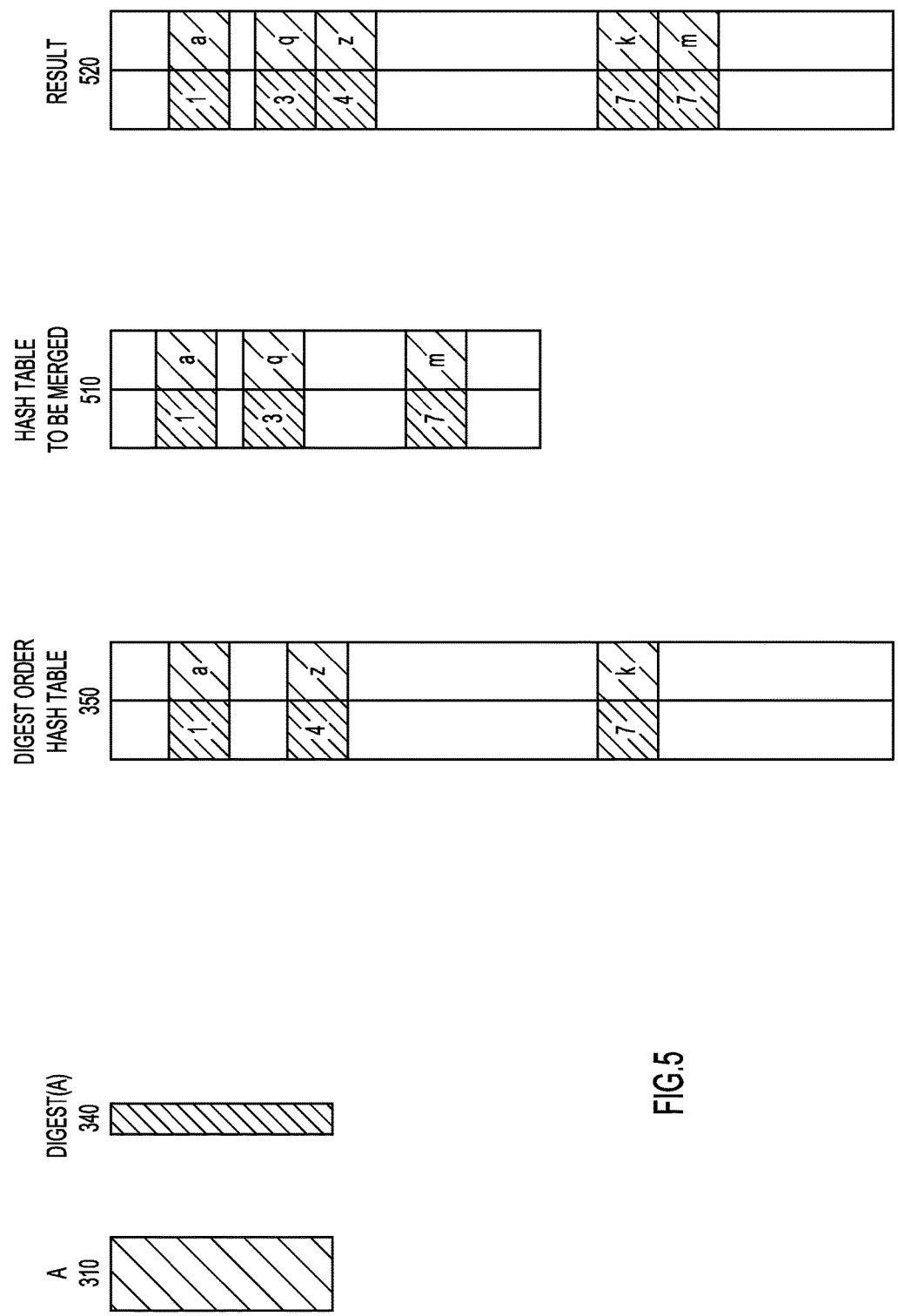
FIG. 5 is an example illustration of a merge sort operation during a second phase of aggregation according to an embodiment of the present invention.

Referring to FIG. 5, a merge operation is shown on two different hash tables 350, 510 of two different sizes. Importantly, both hash tables are in digest order, and by performing a merge sort operation, the two tables can be "zipped" together. If two values are found with the same digest, aggregation is performed, otherwise, the values are placed into digest order, as shown in resultant hash table 520.

Present invention embodiments perform a single stage of hash table lookup based aggregation during the first phase, and allow streaming aggregation to be performed by a merge sort operation during the second phase. As a result, aggregation speeds may increase up to nearly a factor of 2, as expensive hash table lookup based computations have been replaced with simpler merging operations. Embodiments of the present invention are applicable to row stores as well as column stores.

Present invention embodiments may also be applied to out-of-core aggregations, wherein processing data generally requires chunking the data into multiple aggregation batches, merging sets of data local to the node, and performing a final stage of aggregation (after re-distribution of the records). In this embodiment, aggregation at a node (for one or more chunks of data) generally proceeds until the accumulated hash table and aggregation state memory reach a predetermined limit regarding the amount of memory available for this type of processing. Once the limit has been exceeded, the aggregation state may be extracted, in digest order, and written to a different level in the memory hierarchy, e.g., a solid state drive (SSD) or hard disk drive (HDD). In some embodiments, aggregation state and hash tables are held in Random Access Memory (RAM) or in CPU cache memory during the first phase. The records being aggregated may come from a level of memory lower than or larger than this, e.g., from cache RAM, from a persistent form in SSD or HDD, or from outside the system as a stream of data. Present invention embodiments are not intended to be limited to these particular examples. The data structures are re-initialized, and the algorithm proceeds to process more data from the data source. This process may repeat multiple times, e.g., every time memory becomes full. Once all of the source data has been consumed, the data written to SSD or HDD or other memory is streamed back into the system, still in digest order, and is merged to form a smaller set of aggregation groups. In a single-node system, this smaller set is the final result, and is returned. In a multi-node system, this smaller set may need to be partitioned among the nodes. The partitioning and redistribution can be performed in a streaming manner on the output of the merge operation, since the aggregation result for a group will not change once the merge has moved on to process a new group. The final merge happens after partitioning and redistribution, and again, is a digest order merge aggregation.

Figure 6:
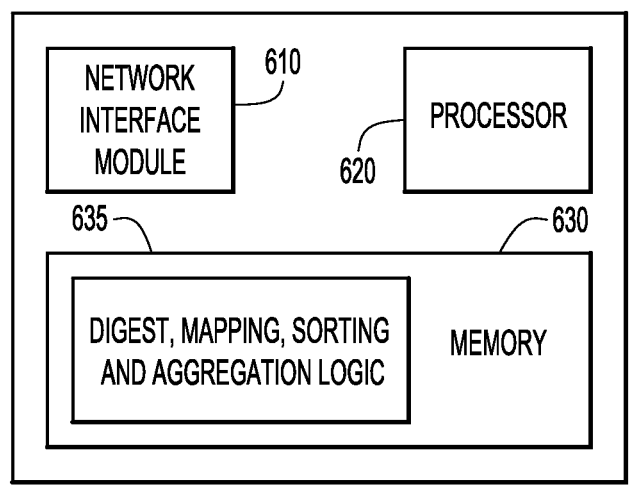
FIG. 6 is an example of a system/apparatus according to an embodiment of the present invention.

Referring to FIG. 6, a node (e.g., any of nodes 140-160) may comprise a network interface 610, a processor 620 and a memory 630. The network interface unit 610 is configured to enable network communications over a network to facilitate communication between data server 130 and any of the other nodes as shown in FIG. 1.

The processor 620 may be embodied by one or more microprocessors or microcontrollers, and executes computer readable program instructions stored in memory 630 to perform the operations described above in connection with FIGS. 1-5.

Memory 630 may be embodied by one or more computer readable storage media that may comprise e.g., read-only memory (ROM), static random access memory (SRAM), magnetic disk storage media devices, optical storage media devices, flash memory devices, etc.

Thus, in general, the memory 630 may comprise one or more tangible (e.g., non-transitory) computer readable storage media (e.g., a memory device) encoded with software comprising computer readable program instructions, and when the software is executed by the processor 620, the processor 620 is operable to perform the operations described herein in connection with digest, mapping, sorting and aggregation logic 635.

Server system 130 and client system 110 may be implemented by any conventional or other computer systems preferably equipped with a display or monitor, a base (e.g., including at least one processor, one or more memories, and/or internal or external network interfaces or communications devices (e.g., modem, network cards, etc.)), optional input devices (e.g., a keyboard, mouse or other input device), and any commercially available and custom software (e.g., server/communications software, module, browser/interface software, etc.).

Alternatively, one or more client systems 110 may analyze stored data when operating as a stand-alone unit. In a stand-alone mode of operation, the client system has access to the data (e.g., nodes 140-160), and includes modules to formulate and/or send query requests to data server 130. The graphical user (e.g., GUI, etc.) or other interface (e.g., command line prompts, menu screens, etc.) may provide resulting data in response to query information provided by a user.

A module may include one or more modules or units to perform the various functions of present invention embodiments described below. The various modules (e.g., logic 635, etc.) may be implemented by any combination of any quantity of software and/or hardware modules or units, and may reside within memory 630 of a node for execution by processor 620.

It will be appreciated that the embodiments described above and illustrated in the drawings represent only a few of the many ways of implementing embodiments for multistage aggregation using a digest order after a first stage of aggregation.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system. These systems may include any types of monitors and input devices (e.g., keyboard, mouse, voice recognition, etc.) to enter and/or view information.

It is to be understood that the software (e.g., software corresponding to logic 635) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., logic 635, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information (e.g., nodes 140-160). The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., query requests from client 110), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The resulting data from the query may include any information arranged in any fashion, and may be configurable based on rules or other criteria to provide desired information to a user (e.g., text analytics, profile scores, etc.).

The present invention embodiments are not limited to the specific tasks or algorithms described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing a database query including an aggregation operation and table grouping columns comprising:
   a memory; and
   a plurality of processing nodes each including a processor, wherein the plurality of processing nodes is configured to:
      generate at each processing node a digest for each of a plurality of database object elements of that processing node based on a first mathematical hash function applied to the table grouping columns that provides unordered digests across the database object elements, wherein generating a digest includes:
         generating a hash value for a first column of the table grouping columns of a database object element; and
         utilizing the generated hash value in the first mathematical hash function and applying the first mathematical hash function to a second column of the table grouping columns of the database object element to produce the digest value for that database object element;
      map at each processing node the plurality of database object elements of that processing node into a plurality of groups within a hash table based on a second mathematical hash function applied to a corresponding digest, wherein the second mathematical hash function produces a value different than the digest to identify a group location and preserve order of the digests within the hash table, and wherein locations within the hash table for the groups are ordered based on the order of corresponding digests to arrange the database object elements in the hash table in digest order;

extract at each processing node the database object elements of that processing node sequentially from the plurality of groups in the hash table in digest order;

perform at each processing node the aggregation operation on the database object elements of that processing node in digest order to produce aggregation information;

transfer the database object elements and aggregation information in digest order between the plurality of processing nodes, wherein the database object elements within a same group and including a same digest are transferred to a same processing node;

apply at each processing node a merge sort to the transferred database object elements in digest order and aggregate the sorted database object elements with a same digest; and produce resulting data for the database query grouped by the database table grouping columns based on the aggregated sorted database object elements.

2. The system of claim 1, wherein the query specifies an arrangement for resulting data.

3. The system of claim 2, wherein each of the plurality of processing nodes is further configured to:

apply data of the database table grouping columns from the plurality of database object elements of that processing node to the first mathematical hash function to determine the digest; and determine groups for the database object elements based on the digest.

4. The system of claim 1, wherein each of the plurality of processing nodes is configured to apply data of the database object elements of that processing node to the hash table to determine database object elements within a same aggregation bucket.

5. The system of claim 1, wherein each of the plurality of processing nodes is configured to:

apply data of additional database object elements of that processing node to the hash table to determine database object elements within a same aggregation bucket, wherein the hash table is in an approximate digest order based on the additional database object elements; and extract the database object elements of that processing node from the hash table and place the extracted database object elements in a fully-sorted digest order.

6. A computer program product for processing a database query including an aggregation operation and table grouping columns, comprising a computer readable storage medium having computer readable program code embodied therewith, the computer readable program code, when executed by a processor of a plurality of processing nodes, causes the plurality of processing nodes to:

generate at each processing node a digest for each of a plurality of database object elements of that processing node based on a first mathematical hash function applied to the table grouping columns that provides unordered digests across the database object elements, wherein generating a digest includes:

generating a hash value for a first column of the table grouping columns of a database object element; and utilizing the generated hash value in the first mathematical hash function and applying the first mathematical hash function to a second column of the table grouping columns of the database object element to produce the digest value for that database object element;

map at each processing node the plurality of database object elements of that processing node into a plurality of groups within a hash table based on a second mathematical hash function applied to a corresponding digest, wherein the second mathematical hash function produces a value different than the digest to identify a group location and preserve order of the digests within the hash table, and wherein locations within the hash table for the groups are ordered based on the order of corresponding digests to arrange the database object elements in the hash table in digest order;

extract at each processing node the database object elements of that processing node sequentially from the plurality of groups in the hash table in digest order;

perform at each processing node the aggregation operation on the database object elements of that processing node in digest order to produce aggregation information;

transfer the database object elements and aggregation information in digest order between the plurality of processing nodes, wherein the database object elements within a same group and including a same digest are transferred to a same processing node;

apply at each processing node a merge sort to the transferred database object elements in digest order and aggregate the sorted database object elements with a same digest; and produce resulting data for the database query grouped by the database table grouping columns based on the aggregated sorted database object elements.

7. The computer program product of claim 6, wherein the query specifies an arrangement for resulting data.

8. The computer program product of claim 7, wherein the computer readable program code is further configured to cause each of the plurality of processing nodes to:

apply data of the database table grouping columns from the plurality of database object elements of that processing node to the first mathematical hash function to determine the digest; and determine groups for the database object elements based on the digest.

9. The computer program product of claim 6, wherein the computer readable program code is further configured to cause each of the plurality of processing nodes to:

apply data of the database object elements of that processing node to the hash table to determine database object elements within a same aggregation bucket.

10. The computer program product of claim 6, wherein the computer readable program code is further configured to cause each of the plurality of processing nodes to:

apply data of additional database object elements of that processing node to the hash table to determine database object elements within a same aggregation bucket, wherein the hash table is in an approximate digest order based on the additional database object elements; and extract the database object elements of that processing node from the hash table and place the extracted database object elements in a fully-sorted digest order.

11. The system of claim 1, wherein the generated hash value is utilized as a seed for the first mathematical hash function.

12. The computer program product of claim 6, wherein the generated hash value is utilized as a seed for the first mathematical hash function.

* * * * *